United States Patent
Wirth, Jr. et al.

[11] Patent Number: 5,810,524
[45] Date of Patent: Sep. 22, 1998

[54] PLUG CUTTER WITH RADIAL RELIEF

[75] Inventors: John Wirth, Jr.; Jay L. Sanger; Mark K. McCool, all of Casper, N.Y.

[73] Assignee: Woodworker's Supply, Inc., Casper, Wyo.

[21] Appl. No.: 690,981

[22] Filed: Aug. 1, 1996

[51] Int. Cl.⁶ .................................................. B23B 51/00
[52] U.S. Cl. ...................... 408/203.5; 408/204; 408/206; 408/703
[58] Field of Search ................................ 408/203.5, 204, 408/206, 207, 703

[56] References Cited

U.S. PATENT DOCUMENTS

| | | | |
|---|---|---|---|
| 117,786 | 8/1871 | Kniffen . | |
| 473,231 | 4/1892 | Leffel . | |
| 475,560 | 5/1892 | Heydenreich . | |
| 476,312 | 6/1892 | Resche . | |
| 1,623,927 | 4/1927 | Lenhardt . | |
| 2,027,139 | 1/1936 | Abramson et al. . | |
| 2,126,476 | 8/1938 | Koonz | 408/203.5 |
| 2,748,817 | 6/1956 | Stearns . | |
| 2,978,002 | 4/1961 | Ransom . | |
| 3,130,763 | 4/1964 | Schlosser et al. . | |
| 3,559,513 | 2/1971 | Hougen | 408/204 |
| 3,611,526 | 10/1971 | Scribner | 408/203.5 |
| 3,870,431 | 3/1975 | Luckenbill et al. | 408/204 |
| 3,966,349 | 6/1976 | Osman et al. | 408/703 |
| 4,063,844 | 12/1977 | Pessia | 408/204 |
| 4,295,763 | 10/1981 | Cunniff . | |
| 4,452,554 | 6/1984 | Hougen . | |
| 4,573,838 | 3/1986 | Omi et al. . | |
| 4,595,321 | 6/1986 | Van Dalen . | |
| 4,693,644 | 9/1987 | Takahashi | 408/703 |
| 4,767,244 | 8/1988 | Peterson . | |
| 4,798,503 | 1/1989 | Huju . | |
| 5,213,456 | 5/1993 | Lee . | |
| 5,217,334 | 6/1993 | Miyazaki et al. | 408/703 |
| 5,401,125 | 3/1995 | Savack et al. | 408/204 |

FOREIGN PATENT DOCUMENTS

| | | |
|---|---|---|
| 1 040 092 | 10/1953 | France . |
| 2 535 635 | 5/1984 | France . |
| 2 635 032 | 2/1990 | France . |
| 293 770 | 8/1916 | Germany . |
| 514 622 | 12/1930 | Germany . |
| 803 130 | 7/1949 | Germany . |
| 57-96710 | 6/1982 | Japan . |
| 2 151 182 | 7/1985 | United Kingdom . |

OTHER PUBLICATIONS

"Genuine Snug–Plug Cutters", Fine Woodworking, No. 104, Feb. 1994, Newton, CT, p. 115.
W.L. Fuller Inc., Condensed Catalog 20A, Oct. 1988 pp. 11 and 12 and back cover.
W.L. Fuller., Catalog Twenty Three, 1994, pp. 33 and 34 and back cover.
Trend 1993/94 Routing Technology Catalog, pp. 57 and 59.
Woodworker's Supply, Inc., Catalog #85, Jun. 1993, p. 128.

*Primary Examiner*—Daniel W. Howell
*Assistant Examiner*—Adesh Bhargava
*Attorney, Agent, or Firm*—Cushman Darby & Cushman Intellectual Property Group of Pillsbury Madison & Sutro, LLP

[57] ABSTRACT

A plug cutter has a main body portion having a longitudinal axis, shank portion extending axially from one end of the main body, and a plurality of blades extending axially from an opposite end of the main body. The blades are formed so that at least a portion of the inner surfaces thereof have a measure of radial relief with respect to the leading edges of the blades. A radial distance from the axis of rotation of the plug cutter to the leading edge of each blade is always less than the radial distance from the axis of rotation to any other portion of the inner surface. Accordingly, when a plug is being cut with the plug cutter, a gap is defined between an outer surface of the plug and the radially relieved portion of the inner surfaces.

21 Claims, 1 Drawing Sheet

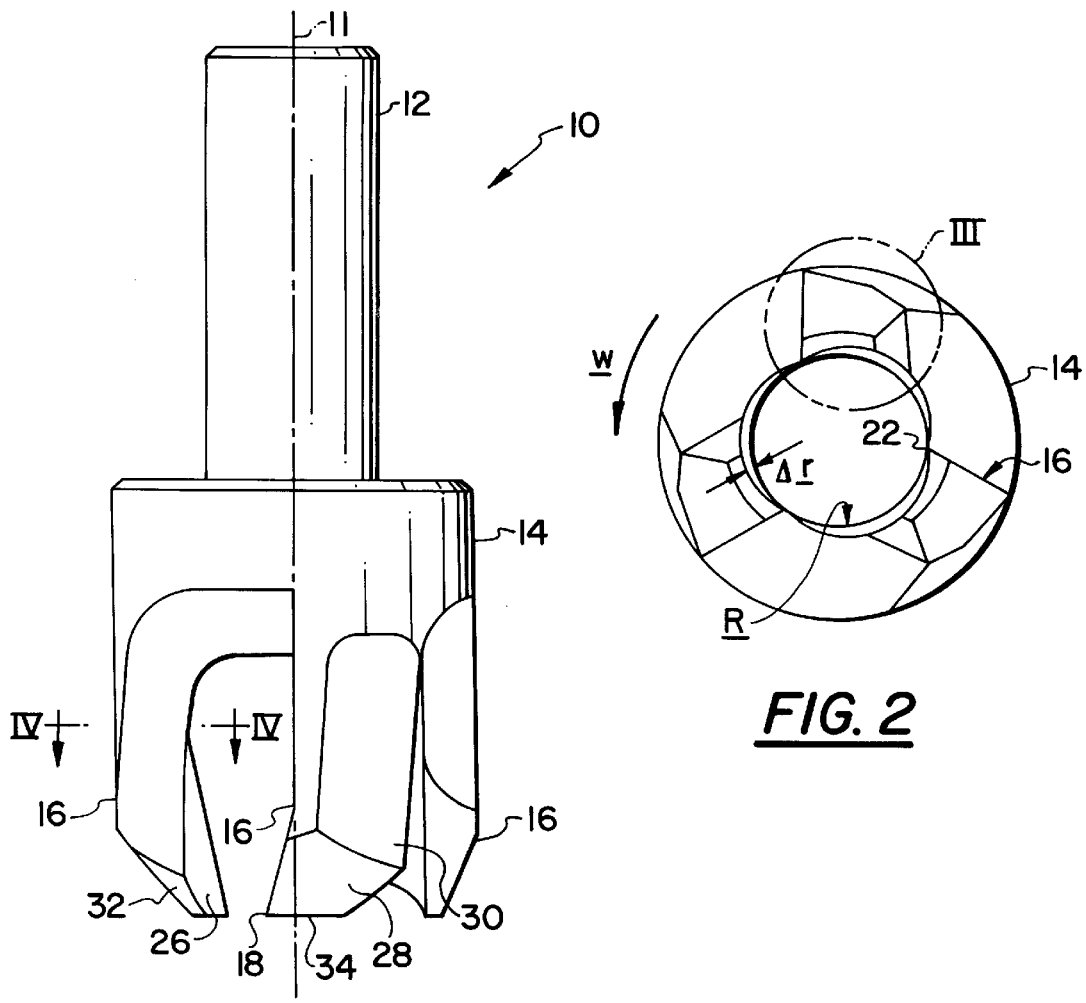
FIG. 2
FIG. 1
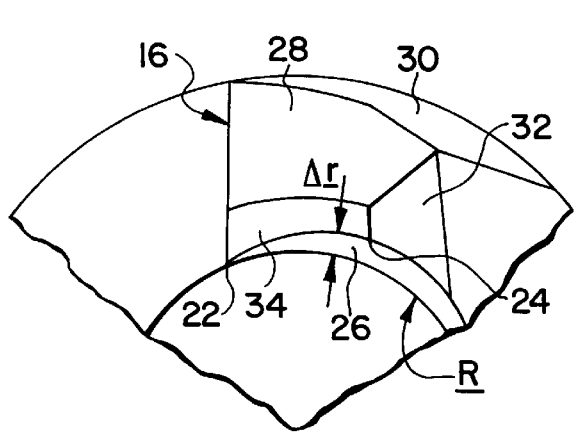
FIG. 3
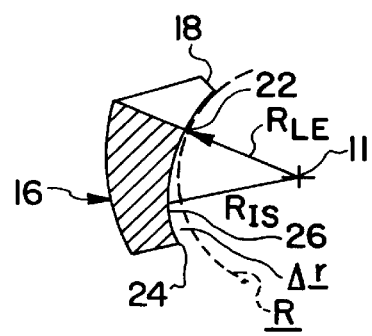
FIG. 4

PLUG CUTTER WITH RADIAL RELIEF

BACKGROUND OF THE INVENTION

1. Field of the Invention

The present invention relates to a plug cutter having cutting blades that are provided with radial relief so that when the plug cutter is cutting a plug from a piece of stock, the cutting blades are less likely to burn the outer surface of the plug and the plug is less likely to break away prematurely from the piece of stock.

2. Description of the Related Art

Conventional plug cutters include a main body portion; a shank extending from one end of the main body portion; and a plurality of cutting tines, or blades, extending axially from an opposite end of the main body. The plurality of cutting tines define a bore that is circular in cross section. The configuration of the bore corresponds to the configuration of the plug produced with the plug cutter.

Typically, a plug cutter is produced by first, drilling a bore axially into a cylindrical piece of steel and, second, milling the cutting blades out of the resulting annular wall surrounding the bore. Each blade has an inner surface that faces radially inwardly toward the center of the bore. At any given circular cross section of the bore, the entire inner surface of each blade lies at a constant radial distance from the center of the bore. In other words, when a conventional plug cutter cuts a plug, the entire inner surface of each blade is in contact with an outer surface of the plug that is being cut.

Contact by the entire inner surface of the blades on the outer surface of the plug while the plug cutter is rotating can cause burning on the outer surface of the plug due to the heat generated by the high speed frictional contact of the inner surface of the blades with the outer surface of the plug. In addition, friction between the outer surface of the plug and the inner surfaces of the blades can cause a torque to be applied from the plug cutter to the plug, causing the plug to prematurely break away from the stock and become lodged in the bore of the plug cutter. In this case, the plug can only be removed from the plug cutter by destroying the plug. Finally, because the entire inner surface of the blades contact the outer surface of the plug, the outer surface is formed by shearing, rather than cutting, resulting in a plug having a rough outer surface.

SUMMARY OF THE INVENTION

The present invention avoids the above-described disadvantages encountered with conventional plug cutters by providing a measure of radial relief between the inner surface of the blades and the circular bore defined by the leading, cutting edges of the blades. Thus, in accordance with the invention, at any given circular cross section of the bore, the leading edge of the blade is located at the shortest radial distance from the center of the bore, whereas the remainder of the inner surface in that cross section is radially spaced from the center of the bore by an amount greater than the leading edge.

Therefore, according to the present invention, a plug cutter is provided that is rotatable about an axis of rotation. The plug cutter comprises a main body having a longitudinal axis coinciding with the axis of rotation; a shank concentric with the axis of rotation extending from one end of the main body; and a plurality of cutting blades extending axially from an opposite end of the main body. The plurality of blades are adapted to cut a plug in a piece of stock as the plug cutter is rotated about the axis of rotation and advanced axially into the piece of stock. Each blade is formed so that, at a given axial position along the blade, a radial distance from the axis of rotation to the inner surface of the blade is smallest at a cutting edge of the blade so that as the plug cutter is cutting a plug, substantially only the cutting edge of each blade makes contact with an outer surface of the plug.

Other objects, features and characteristics of the present invention will become apparent upon consideration of the following description and the appended claims with reference to the accompanying drawings, all of which form a part of the specification and wherein like reference numerals designate corresponding parts in the various figures.

BRIEF DESCRIPTION OF THE DRAWINGS

FIG. 1 is a side elevation of a plug cutter according to the present invention;

FIG. 2 is an end view of a plug cutter according to the present invention as viewed looking up into the bore defined by the cutting blades;

FIG. 3 is a partial view showing in detail that portion of FIG. 2 located within the circle III; and FIG. 4 is a cross section viewed along the line IV—IV in FIG. 1.

DETAILED DESCRIPTION OF THE PRESENTLY PREFERRED EMBODIMENT

A plug cutter 10 according to a presently preferred exemplary embodiment of the invention is shown in FIG. 1. As in conventional plug cutters, plug cutter 10 has an axis of rotation 11, a main body portion 14, having a longitudinal axis coinciding with the axis of rotation 11, and a cylindrical shank portion 12 extending from one end of the main body 14 that is adapted to fit into the jaws of a drill (not shown) in a known manner.

The plug cutter 10 is preferably formed from stainless steel, but other metals of suitable strength and hardness are acceptable.

A plurality of blades, or tines, 16 extend axially from an opposite end of the main body 14. Although many conventional plug cutters comprise four such cutting blades extending from the body, in the preferred embodiment of the present invention, only three such cutting blades 16 are preferably provided so that wood chips, created when a plug is being cut, are more readily ejected from between the cutting blades and the openings between the cutting blades are less likely to clog. It is contemplated in the present invention, however, that more than three blades extending from the body of the plug cutter may be provided.

As shown in FIGS. 1–3, cutting blades 16 are formed with a number of facets, such as facets 28, 30, 32 and 34, and a cutting tip 18. As shown in FIG. 1, facet 34 is shown to lie on a horizontal plane. It is conceivable, however, that the blades 16 could be formed so that facet 34 does not lie in a horizontal plane and tip 18 extends somewhat downwardly.

Each blade 16 has an inner surface 26 facing generally radially inwardly toward the center of a bore defined by the blades 16 (i.e., toward the axis of rotation 11 of the plug cutter 10). The inner surface 26 of each blade 16 commences with a leading edge 22 extending from tip 18 along substantially the entire axial length of the blade 16. Leading edge 22 defines the forwardmost portion of the inner surface 26 with respect to the direction of rotation W as shown in FIG. 2. The leading edge 22 is the cutting edge of the blade. As shown in FIGS. 2 and 3, the leading edges 22 of the blades 16 all lie on a circle R which corresponds to the bore defined by the blades and also corresponds to the configuration of an outer surface of a plug cut by the plug cutter. The inner surface 26 of each blade terminates along the axial length of each blade at a trailing edge 24.

As shown in FIG. 4, at any given longitudinal, or axial, position along the blade 16, the leading edge 22 of the blade is disposed at a radius $R_{LE}$ from the axis of rotation 11, and the inner surface 26 is disposed at a radius $R_{IS}$ from the axis 11. $R_{IS}$ need not be constant from the leading edge 22 to the trailing edge 24, but it is always the case that for at least a portion of the inner surface, $R_{LE}<R_{IS}$. Thus, at least a portion of the inner surface 26 is provided with a measure of radial relief, $\Delta r=R_{IS}-R_{LE}$, with respect to the leading edge 22, and, as a plug is being cut with the plug cutter, a gap is defined between the plug being cut and the radially relieved portion of the inner surface.

In the plug cutter of the present invention, it is presently preferred that the bore defined by the blades 16 be flared or tapered outwardly along at least a portion of the axial length of the bore so that the diameter of circle R is smallest adjacent or near body 14 and greatest at or adjacent the cutting tips 18 of the blades. With the blades tapered in this manner, the radius $R_{LE}$ of the leading edge 22 of the blade 16 will vary along at least a portion of the axial length of the blade. In the currently preferred embodiment, the blades are gradually tapered along substantially their entire length so that $R_{LE}$ varies along substantially the entire length of the blade. In any event, in accordance with most preferred embodiments of the invention, at any given axial position along the blades, $R_{LE}<R_{IS}$.

With the blades tapered in the preferred manner described above, a plug cut by the plug cutter of the presently preferred embodiment of the invention will too be tapered along substantially the entire axial length thereof.

While not a preferred configuration, the bore defined by the blades could be substantially cylindrical, i.e, have substantially no taper, in which case a plug cut by the plug cutter would be substantially cylindrical in shape.

As shown in FIGS. 3 and 4, in the illustrated embodiment, the radial relief $\Delta r$ increases gradually from about zero at the leading edge 22 to a maximum value at the trailing edge 24. While this is a preferred configuration, it is only necessary that $R_{LE}$ be less than $R_{IS}$, and the variation of $\Delta r$ from leading edge 22 to trailing edge 24 is not critical.

When a plug is being cut by a plug cutter 10 according to the present invention, substantially only the leading edge 22 of each blade 16 contacts the outer surface of the plug being cut while the plug cutter 10 is rotating. This minimal contact between the blade 16 and the plug lessens the amount of burning due to frictional heat and reduces the likelihood that the plug will break off and become lodged in the plug cutter. Also, in the preferred embodiment of the present invention, because substantially only the leading edge of the blade is in contact with the plug, it is possible that the leading edge of the plug cutter of the present invention will effect a sharper cutting edge than a leading edge of a conventional plug cutter having no radial relief.

While the invention has been described in connection with what is presently considered to be the most practical and preferred embodiment it is to be understood that the invention is not to be limited to the disclosed embodiment, but, on the contrary, it is intended to cover various modifications and equivalent arrangements included within the spirit and scope of the appended claims. Thus, it is to be understood that variations in the particular parameters used in defining the plug cutter with radial relief of the present invention can be made without departing from the novel aspects of this invention as defined in the claims.

What is claimed is:

1. A plug cutter rotatable about an axis of rotation comprising:

a main body having a longitudinal axis coinciding with said axis of rotation a shank extending axially from one end of said main body concentrically with said axis of rotation; and a plurality of cutting blades extending axially from an opposite end of said main body and terminating in a distal end, each of said blades having an inner surface facing generally radially inwardly, said plurality of blades being adapted to cut a plug in a piece of stock as said plug cutter is rotated about said axis of rotation and advanced axially into the piece of stock, at least a portion of said inner surface of each said blade being radially relieved with respect to a leading edge thereof so that as said plug cutter is cutting the plug, a gap is defined between an outer surface of the plug being cut and said radially relieved portion, wherein said plurality of cutting blades are constructed and arranged so that when said plug cutter is rotated, said plurality of blades define a bore that is tapered along an extent thereof such that a radial distance between said leading edge and said axis of rotation is greater at said distal ends than adjacent said main body.

2. The plug cutter of claim 1 wherein there are three said cutting blades.

3. The plug cutter of claim 1 wherein said distal end of each said blade defines a cutting tip.

4. The plug cutter of claim 1 wherein said plurality of cutting blades are constructed and arranged so that when said plug cutter is rotated, said plurality of cutting blades define a bore that is tapered along an entire axial length of said bore.

5. The plug cutter of claim 1 wherein said plurality of cutting blades are constructed and arranged so that when said plug cutter is rotated, said plurality of cutting blades define a bore that is, progressing away from said body, continuously tapered outwardly.

6. The plug cutter of claim 1 wherein substantially the entire inner surface of each said blade is radially relieved with respect to said leading edge thereof.

7. The plug cutter of claim 1 wherein said cutting blades are configured so that the plug cut by said plug cutter is continuously tapered from one end thereof to the other end thereof.

8. The plug cutter of claim 1 wherein as the plug cutter is cutting the plug, substantially only the leading edge of each blade is in contact with the outer surface of the plug.

9. The plug cutter of claim 1 wherein said plug cutter is formed of stainless steel.

10. A plug cutter rotatable about an axis of rotation comprising:

a main body having a longitudinal axis coinciding with said axis of rotation a shank extending axially from one end of said main body concentrically with said axis of rotation; and a plurality of cutting blades extending axially from an opposite end of said main body and terminating at a distal end, each of said blades having an inner surface facing generally radially inwardly, said plurality of blades being adapted to cut a plug in a piece of stock as said plug cutter is rotated about said axis of rotation and advanced axially into the piece of stock, each blade being formed so that, at a given axial position along each said blade, a radial distance from said axis of rotation to said inner surface is smallest at a leading edge thereof so that as said plug cutter is cutting the plug, substantially only said leading edge of each said blade is in contact with an outer surface of the plug, wherein said plurality of cutting blades are constructed and arranged so that when said plug cutter is rotated, said plurality of blades define a bore that is tapered along an extent thereof such that a radial distance between said leading edge and said axis of rotation is greater at said distal ends than adjacent said main body.

11. The plug cutter of claim 10 wherein there are three said cutting blades.

12. The plug cutter of claim 10 wherein said distal end of each said blade defines a cutting tip.

13. The plug cutter of claim 10 wherein said plurality of cutting blades are constructed and arranged so that when said plus cutter is rotated, said plurality of cutting blades define a bore that is tapered along an entire axial length of said bore.

14. The plug cutter of claim 10 wherein said plurality of cutting blades are constructed and arranged so that when said plug cutter is rotated, said plurality of cutting blades define a bore that is, progressing away from said body, continuously tapered outwardly.

15. The plug cutter of claim 10 wherein, progressing along said inner surface from said leading edge to a trailing edge of said inner surface at a given axial position of each said blade, said radial distance from said axis of rotation to said inner surface becomes progressively larger.

16. The plug cutter of claim 10 wherein said cutting blades are configured so that the plug cut by said plug cutter is continuously tapered from one end thereof to the other end thereof.

17. The plug cutter of claim 10 wherein said plug cutter is formed of stainless steel.

18. A plug cutter rotatable about an axis of rotation comprising:

a main body having a longitudinal axis coinciding with said axis of rotation a shank extending axially from one end of said main body concentrically with said axis of rotation; and a plurality of cutting blades extending axially from an opposite end of said main body and terminating in a distal end, each of said blades having an inner surface facing generally radially inwardly, said plurality of blades being adapted to cut a plug in a piece of stock as said plug cutter is rotated about said axis of rotation and advanced axially into the piece of stock, said main body, shank, and plurality of cutting blades each being formed of stainless steel.

19. The plug cutter of claim 18 wherein at least a portion of said inner surface of each said blade is radially relieved with respect to a leading edge thereof so that as said plug cutter is cutting the plug, a gap is defined between an outer surface of the plug being cut and at least a part of said radially relieved portion.

20. The plug cutter of claim 18 wherein each blade is formed so that, at a given axial position along each said blade, a radial distance from said axis of rotation to said inner surface is smallest at a leading edge thereof so that as said plug cutter is cutting the plug, substantially only said leading edge of each said blade is in contact with an outer surface of the plug.

21. The plug cutter of claim 20 wherein, progressing along said inner surface from said leading edge to a trailing edge of said inner surface at a given axial position of each said blade, said radial distance from said axis of rotation to said inner surface becomes progressively larger.

* * * * *